US012627542B2

(12) United States Patent
Zach et al.

(10) Patent No.: US 12,627,542 B2
(45) Date of Patent: May 12, 2026

(54) FREQUENCY OFFSET CORRECTION

(71) Applicant: QUALCOMM Incorporated, San Diego, CA (US)

(72) Inventors: Noam Zach, Kiryat Ono (IL); Guy Wolf, Rosh Haayin (IL); Sharon Levy, Binyamina (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 18/147,577

(22) Filed: Dec. 28, 2022

(65) Prior Publication Data

US 2024/0223415 A1 Jul. 4, 2024

(51) Int. Cl.
H04L 27/00 (2006.01)

(52) U.S. Cl.
CPC .... H04L 27/0014 (2013.01); H04L 2027/003 (2013.01)

(58) Field of Classification Search
None
See application file for complete search history.

(56) References Cited

U.S. PATENT DOCUMENTS

2007/0268976 A1* 11/2007 Brink .................. H04B 1/7183
                                                    375/344
2014/0064418 A1* 3/2014 Astrachan ............... H04B 1/30
                                                    375/316

2015/0257020 A1* 9/2015 Dural .................... H04W 24/10
                                                    370/252
2016/0205672 A1* 7/2016 Kim .................... H04L 27/2675
                                                    370/330
2017/0347340 A1* 11/2017 Haley ............... H04L 25/03343
2020/0084739 A1* 3/2020 Si ....................... H04W 72/0453
2021/0392625 A1* 12/2021 Lin ........................ H04W 72/23
2022/0046566 A1* 2/2022 Leng ................ H04W 74/0833
2022/0061099 A1* 2/2022 Sun ................. H04W 74/0833
2022/0149930 A1* 5/2022 Rolle ................... H04L 5/0044
2022/0173945 A1* 6/2022 Li ........................ H04L 27/0014
2022/0201631 A1* 6/2022 Wu ................... H04W 56/0005
2022/0386259 A1* 12/2022 Chen ................. H04B 7/18563
2023/0133979 A1* 5/2023 Sun ........................ H04L 5/0051
                                                    370/329
2023/0180164 A1* 6/2023 Kim ................. H04W 56/0045
                                                    370/324
2024/0049205 A1* 2/2024 Fei ........................ H04L 5/0012
2025/0106075 A1* 3/2025 Jian ..................... H04L 27/0014

* cited by examiner

*Primary Examiner* — Kodzovi Acolatse
(74) *Attorney, Agent, or Firm* — Harrity & Harrity, LLP

(57) ABSTRACT

Various aspects of the present disclosure generally relate to wireless communication. In some aspects, a user equipment (UE) may transmit a first communication having a first frequency offset correction applied. The UE may receive an indication of a frequency offset of the first communication. The UE may transmit a second communication having a second frequency offset correction applied, the second frequency offset correction based at least in part on the first frequency offset correction and the frequency offset of the first communication. Numerous other aspects are described.

29 Claims, 11 Drawing Sheets

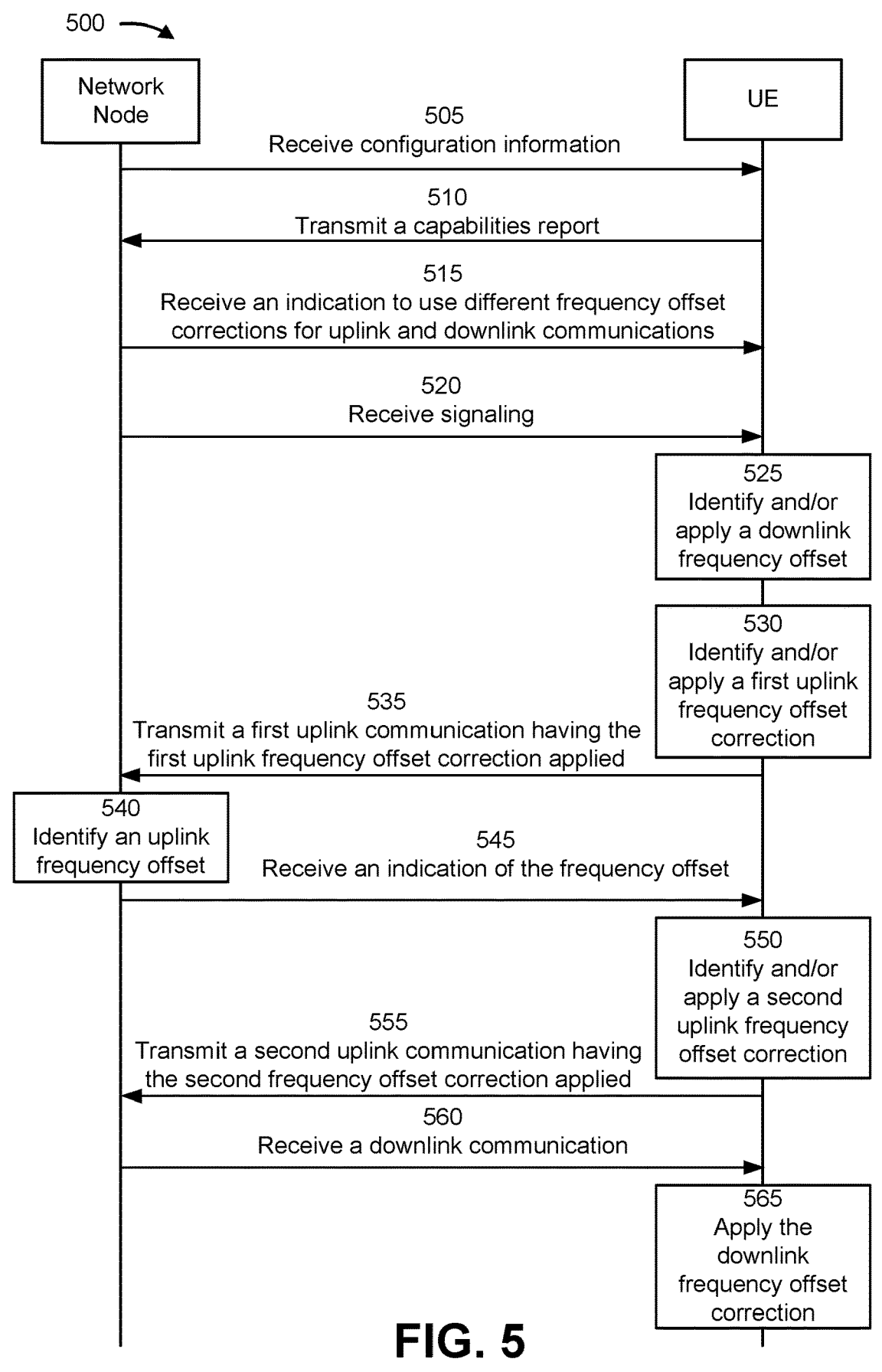

500

| Network Node | | UE |
| --- | --- | --- |

505
Receive configuration information

510
Transmit a capabilities report

515
Receive an indication to use different frequency offset corrections for uplink and downlink communications 520
Receive signaling 525
Identify and/or apply a downlink frequency offset 530
Identify and/or apply a first uplink frequency offset correction 535
Transmit a first uplink communication having the first uplink frequency offset correction applied 540
Identify an uplink frequency offset 545
Receive an indication of the frequency offset 550
Identify and/or apply a second uplink frequency offset correction 555
Transmit a second uplink communication having the second frequency offset correction applied 560
Receive a downlink communication 565
Apply the downlink frequency offset correction

FIG. 5

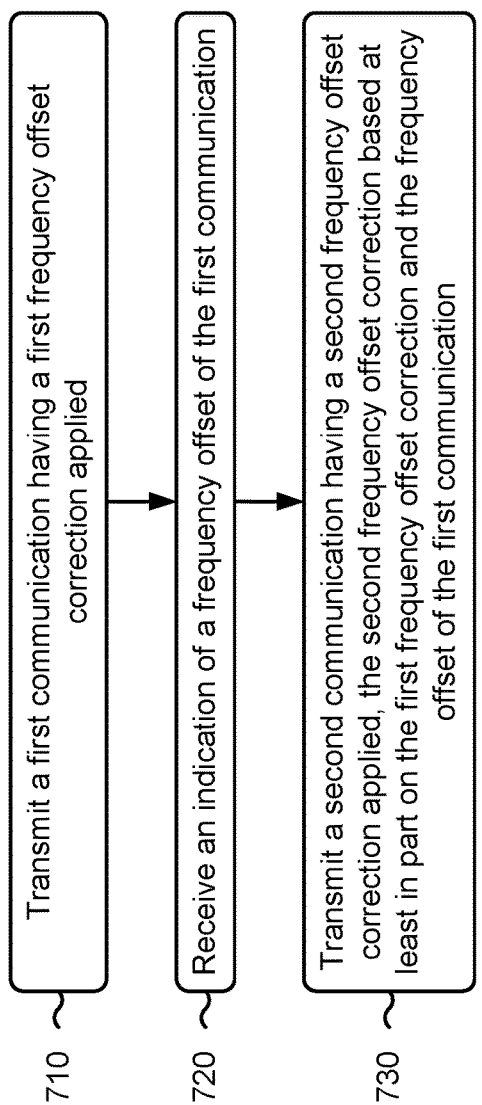

710  Transmit a first communication having a first frequency offset correction applied 720  Receive an indication of a frequency offset of the first communication 730  Transmit a second communication having a second frequency offset correction applied, the second frequency offset correction based at least in part on the first frequency offset correction and the frequency offset of the first communication

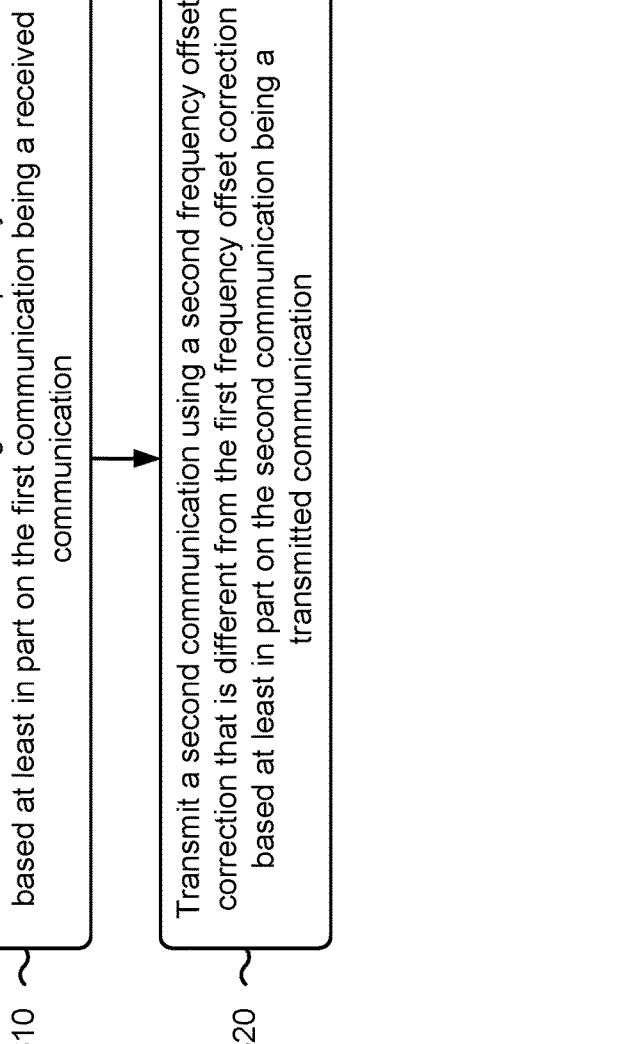

Receive a first communication using a first frequency offset correction based at least in part on the first communication being a received communication

820

Transmit a second communication using a second frequency offset correction that is different from the first frequency offset correction based at least in part on the second communication being a transmitted communication

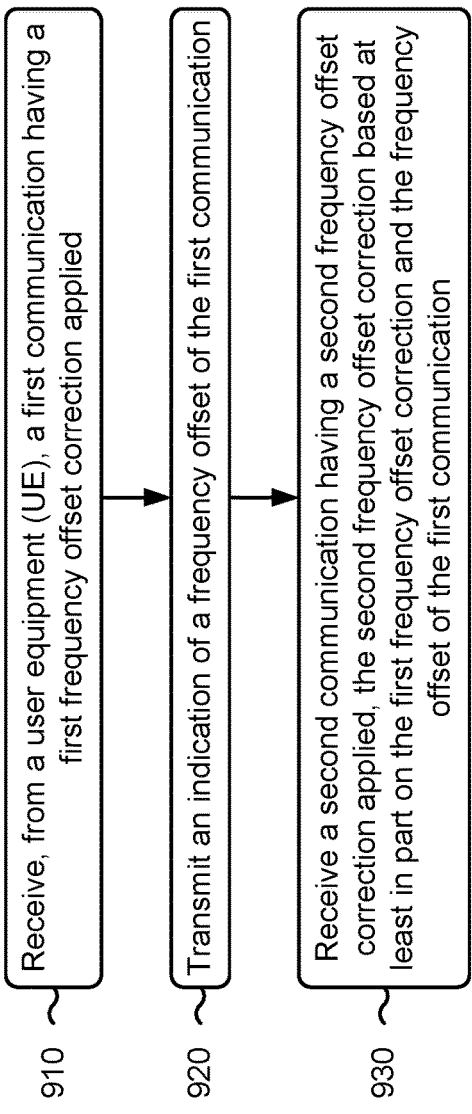

910 — Receive, from a user equipment (UE), a first communication having a first frequency offset correction applied 920 — Transmit an indication of a frequency offset of the first communication 930 — Receive a second communication having a second frequency offset correction applied, the second frequency offset correction based at least in part on the first frequency offset correction and the frequency offset of the first communication

FREQUENCY OFFSET CORRECTION

FIELD OF THE DISCLOSURE

Aspects of the present disclosure generally relate to wireless communication and to techniques and apparatuses for frequency offset correction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a first communication having a first frequency offset correction applied. The method may include receiving an indication of a frequency offset of the first communication. The method may include transmitting a second communication having a second frequency offset correction applied, the second frequency offset correction based at least in part on the first frequency offset correction and the frequency offset of the first communication.

Some aspects described herein relate to a method of wireless communication performed by a UE. The method may include receiving a first communication using a first frequency offset correction based at least in part on the first communication being a received communication. The method may include transmitting a second communication using a second frequency offset correction that is different from the first frequency offset correction based at least in part on the second communication being a transmitted communication.

Some aspects described herein relate to a method of wireless communication performed by a network node. The method may include receiving, from a UE, a first communication having a first frequency offset correction applied. The method may include transmitting an indication of a frequency offset of the first communication. The method may include receiving a second communication having a second frequency offset correction applied, the second frequency offset correction based at least in part on the first frequency offset correction and the frequency offset of the first communication.

Some aspects described herein relate to a UE. The user equipment may include a memory and one or more processors coupled to the memory. The one or more processors may be configured to transmit a first communication having a first frequency offset correction applied. The one or more processors may be configured to receive an indication of a frequency offset of the first communication. The one or more processors may be configured to transmit a second communication having a second frequency offset correction applied, the second frequency offset correction based at least in part on the first frequency offset correction and the frequency offset of the first communication.

Some aspects described herein relate to a UE. The UE may include a memory and one or more processors coupled to the memory. The one or more processors may be configured to receive a first communication using a first frequency offset correction based at least in part on the first communication being a received communication. The one or more processors may be configured to transmit a second communication using a second frequency offset correction that is different from the first frequency offset correction based at least in part on the second communication being a transmitted communication.

Some aspects described herein relate to a network node. The network node may include a memory and one or more processors coupled to the memory. The one or more processors may be configured to receive, from a UE, a first communication having a first frequency offset correction applied. The one or more processors may be configured to transmit an indication of a frequency offset of the first communication. The one or more processors may be configured to receive a second communication having a second frequency offset correction applied, the second frequency offset correction based at least in part on the first frequency offset correction and the frequency offset of the first communication.

Some aspects described herein relate to a non-transitory computer-readable medium that stores a set of instructions by a UE. The set of instructions, when executed by one or more processors of the UE, may cause the UE to transmit a first communication having a first frequency offset correction applied. The set of instructions, when executed by one or more processors of the UE, may cause the UE to receive an indication of a frequency offset of the first communication. The set of instructions, when executed by one or more processors of the UE, may cause the UE to transmit a second communication having a second frequency offset correction applied, the second frequency offset correction based at least in part on the first frequency offset correction and the frequency offset of the first communication.

Some aspects described herein relate to a non-transitory computer-readable medium that stores a set of instructions by a one or more instructions that, when executed by one or more processors of an UE. The set of instructions, when executed by one or more processors of the one or more instructions that, when executed by one or more processors of an UE, may cause the one or more instructions that, when executed by one or more processors of an UE to receive a first communication using a first frequency offset correction based at least in part on the first communication being a received communication. The set of instructions, when executed by one or more processors of the one or more instructions that, when executed by one or more processors of an UE, may cause the one or more instructions that, when executed by one or more processors of an UE to transmit a second communication using a second frequency offset correction that is different from the first frequency offset correction based at least in part on the second communication being a transmitted communication.

Some aspects described herein relate to a non-transitory computer-readable medium that stores a set of instructions by a network node. The set of instructions, when executed by one or more processors of the network node, may cause the network node to receive, from a UE, a first communication having a first frequency offset correction applied. The set of instructions, when executed by one or more processors of the network node, may cause the network node to transmit an indication of a frequency offset of the first communication. The set of instructions, when executed by one or more processors of the network node, may cause the network node to receive a second communication having a second frequency offset correction applied, the second frequency offset correction based at least in part on the first frequency offset correction and the frequency offset of the first communication.

Some aspects described herein relate to an apparatus. The apparatus may include means for transmitting a first communication having a first frequency offset correction applied. The apparatus may include means for receiving an indication of a frequency offset of the first communication. The apparatus may include means for transmitting a second communication having a second frequency offset correction applied, the second frequency offset correction based at least in part on the first frequency offset correction and the frequency offset of the first communication.

Some aspects described herein relate to an apparatus. The apparatus may include means for receiving a first communication using a first frequency offset correction based at least in part on the first communication being a received communication. The apparatus may include means for transmitting a second communication using a second frequency offset correction that is different from the first frequency offset correction based at least in part on the second communication being a transmitted communication.

Some aspects described herein relate to an apparatus. The apparatus may include means for receiving, from a UE, a first communication having a first frequency offset correction applied. The apparatus may include means for transmitting an indication of a frequency offset of the first communication. The apparatus may include means for receiving a second communication having a second frequency offset correction applied, the second frequency offset correction based at least in part on the first frequency offset correction and the frequency offset of the first communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram of an example associated with frequency offset correction, in accordance with the present disclosure.

FIG. 7 is a diagram illustrating an example process performed, for example, by a UE, in accordance with the present disclosure.

FIG. 8 is a diagram illustrating an example process performed, for example, by a UE, in accordance with the present disclosure.

FIG. 9 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
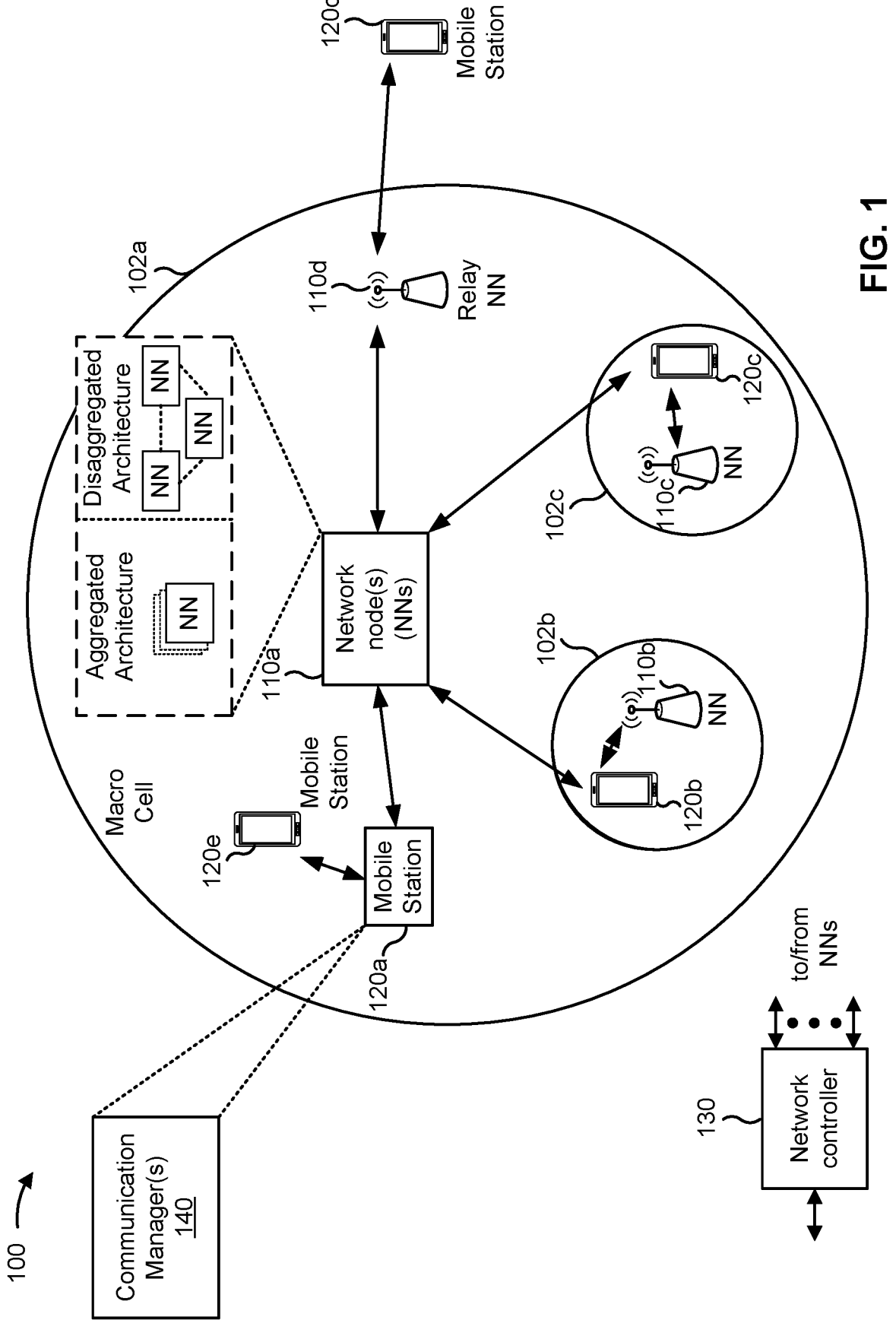
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a first communication having a first frequency offset correction applied; receive an indication of a frequency offset of the first communication; and transmit a second communication having a second frequency offset correction applied, the second frequency offset correction based at least in part on the first frequency offset correction and the frequency offset of the first communication. In some aspects, the UE 120 may include a communication manager 140. As described in more detail elsewhere herein, the communication manager 140 may receive a first communication using a first frequency offset correction based at least in part on the first communication being a received communication; and transmit a second communication using a second frequency offset correction that is different from the first frequency offset correction based at least in part on the second communication being a transmitted communication. Additionally, or alternatively, the communication manager 140 may perform one or more other operations described herein.

In some aspects, the network node 110 may include a communication manager 150. As described in more detail elsewhere herein, the communication manager 150 may receive, from a UE, a first communication having a first frequency offset correction applied; transmit an indication of a frequency offset of the first communication; and receive a second communication having a second frequency offset correction applied, the second frequency offset correction based at least in part on the first frequency offset correction and the frequency offset of the first communication. Additionally, or alternatively, the communication manager 150 may perform one or more other operations described herein.

As indicated above, FIG. 1 is provided as an example. Other examples may differ from what is described with regard to FIG. 1.

Figure 2:
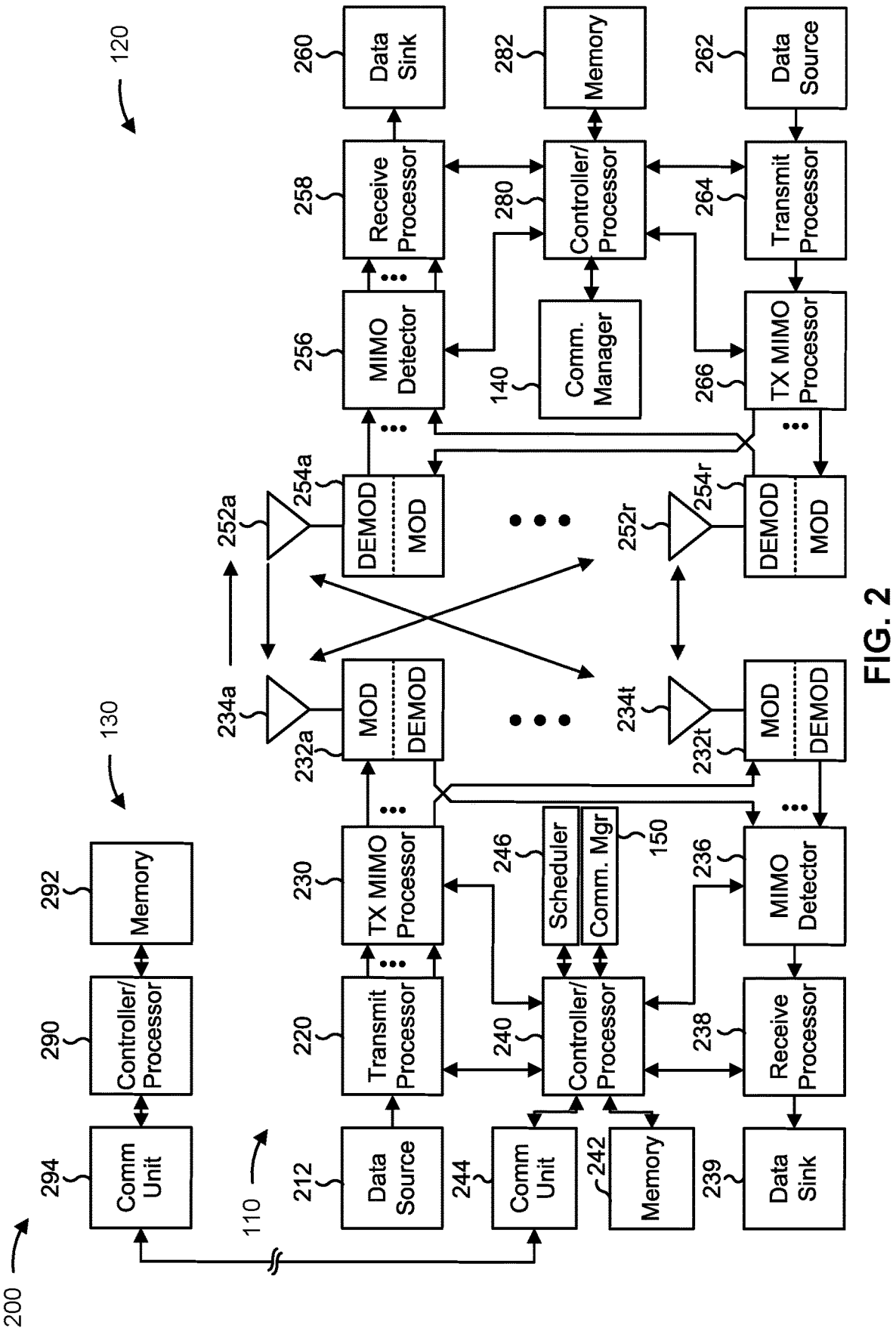
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with frequency offset correction, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for transmitting a first communication having a first frequency offset correction applied; means for receiving an indication of a frequency offset of the first communication; and/or means for transmitting a second communication having a second frequency offset correction applied, the second frequency offset correction based at least in part on the first frequency offset correction and the frequency offset of the first communication. In some aspects, the UE includes means for receiving a first communication using a first frequency offset correction based at least in part on the first communication being a received communication; and/or means for transmitting a second communication using a second frequency offset correction that is different from the first frequency offset correction based at least in part on the second communication being a transmitted communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving, from a UE, a first communication having a first frequency offset correction applied; means for transmitting an indication of a frequency offset of the first communication; and/or means for receiving a second communication having a second frequency offset correction applied, the second frequency offset correction based at least in part on the first frequency offset correction and the frequency offset of the first communication. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
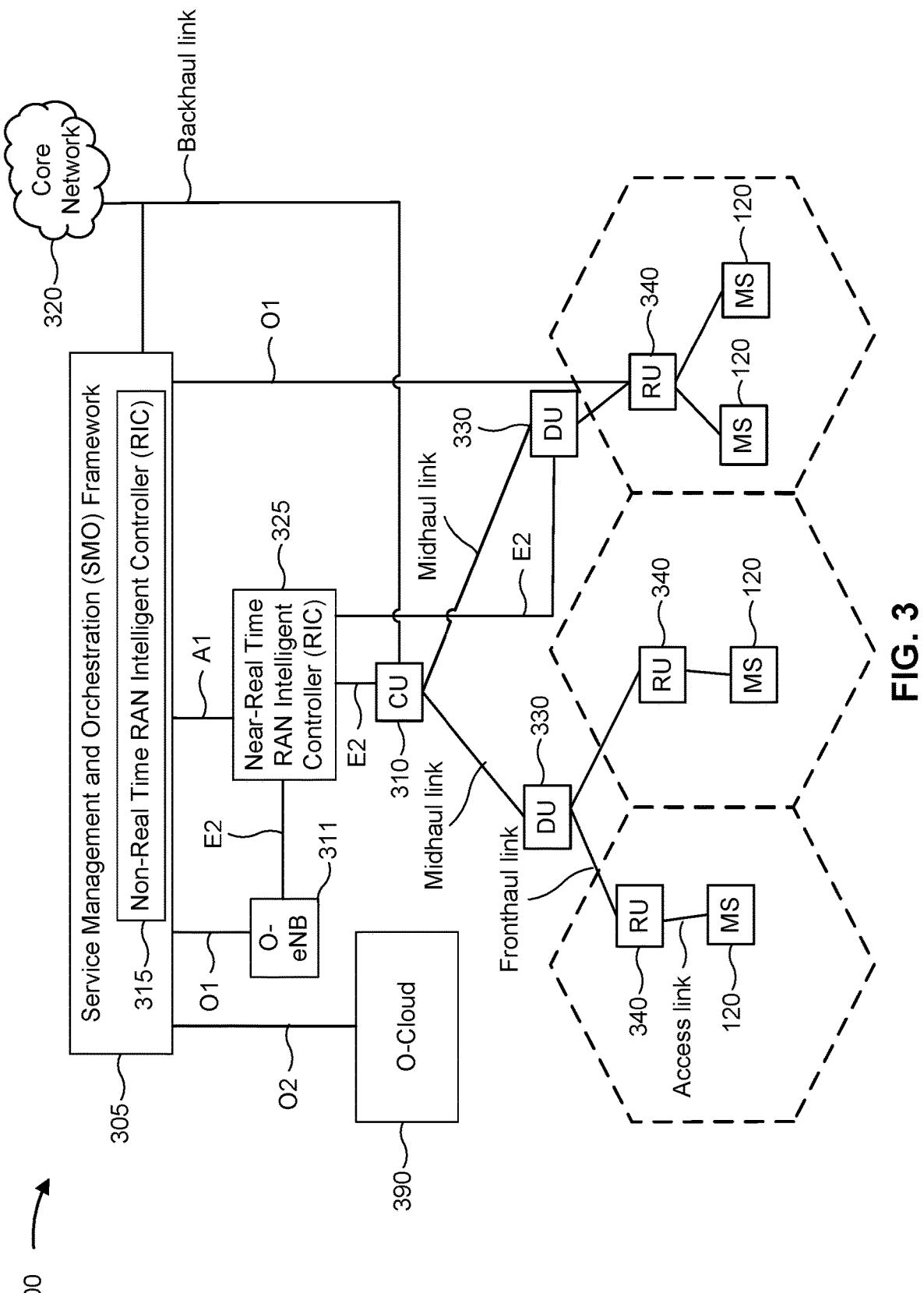
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
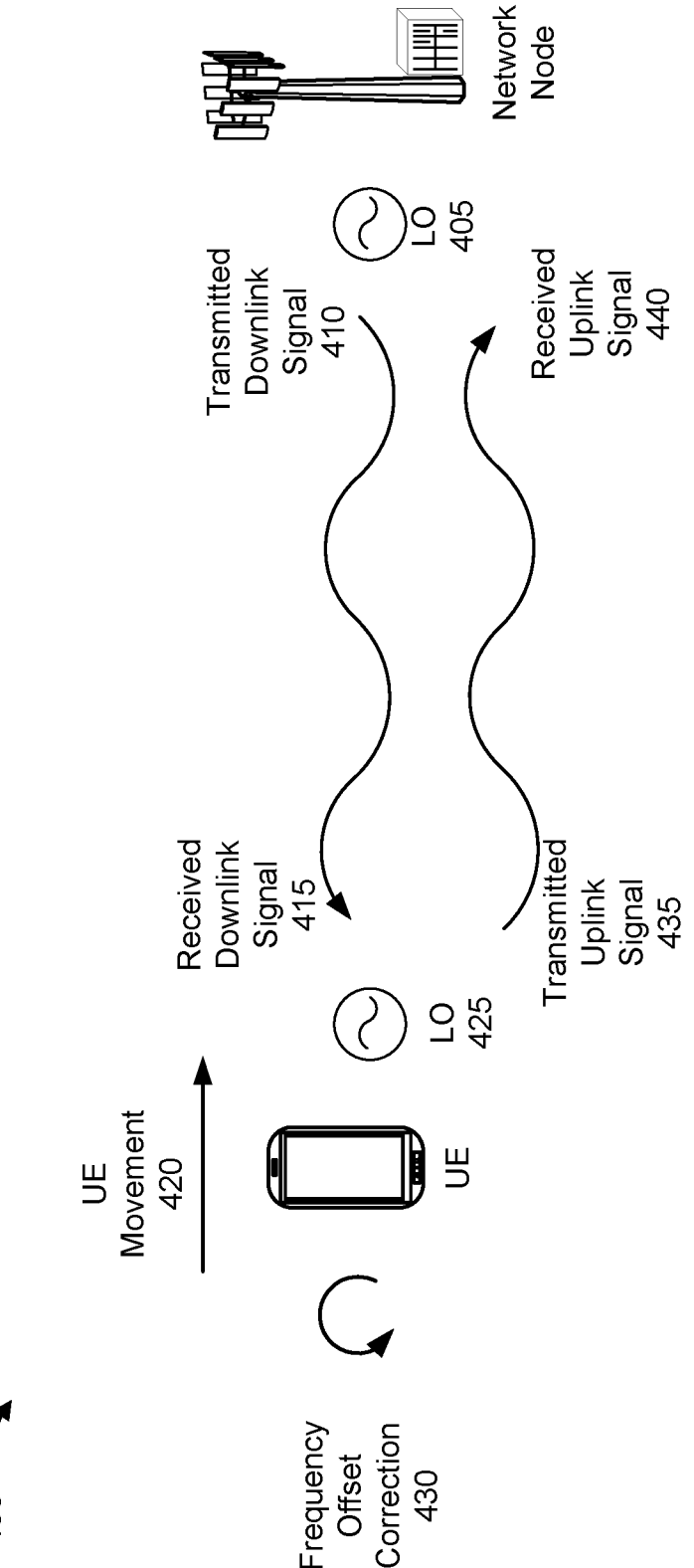
FIG. 4 is a diagram illustrating an example of frequency offset correction, in accordance with the present disclosure.

FIG. 4 is a diagram illustrating an example 400 of frequency offset correction, in accordance with the present disclosure. As shown in FIG. 4, a UE and a network node may communicate wirelessly using, for example, a wireless network (e.g., wireless network 100).

As shown in FIG. 4, the network node may include a local oscillator (LO) 405 that is configured to convert a signal from a baseband frequency to a carrier frequency before transmitting. In this way, the network node may convert a signal that is modulated to include information, and is transmitted on a carrier frequency that corresponds to an allocation for the UE to receive the information.

The network node may generate a transmitted downlink signal 410 that is transmitted over the air on a wireless channel to the UE. The UE may receive a received downlink signal 415 after the transmitted downlink signal travels over the air to the UE. The received downlink signal 415 may include noise and/or other distortions from the transmitted downlink signal 410. For example, based at least in part on UE movement 420, a frequency of the transmitted downlink signal 410 may be shifted up (e.g., if the UE is moving toward the network node) or down (e.g., if the UE is moving away from the network node. This shift may be referred to as a Doppler shift.

The UE may include an LO 425 used to receive and/or transmit communications. The LO 425 may not match the LO 405 (e.g., causing an LO mismatch), which may shift the transmitted downlink signal 410 (and the received downlink signal 415).

The transmitted downlink signal 410 may have a frequency offset when processed by the UE (e.g., for decoding) that is based at least in part on Doppler shift and/or an LO mismatch, among other examples. The UE may perform frequency offset correction 430 to the received downlink signal 415 after being processed by the LO 425 (e.g., mixed with the LO 425). For example, the UE may identify frequency resources (e.g., subcarriers and/or resource blocks) that have been offset (e.g., shifted) from expected frequency locations and correct a current downlink communication and/or subsequent downlink communications based at least in part on an identified frequency offset.

The UE may subsequently transmit a communication to the network node. The UE may mix a baseband signal with the LO 425 to generate carrier frequency-based signal for transmission to the network node. The UE may apply a frequency offset correction to the baseband signal before mixing with the LO 425. In this way, the UE may compensate for an expected frequency offset (e.g., expected based at least in part on the frequency offset of the downlink communication) before transmission over the air to the network node.

The UE may transmit a transmitted uplink signal 435 that arrives at the network node as a received uplink signal 440. Based at least in part on the UE movement 420, the received uplink signal 440 may be shifted. The network node may mix the received uplink signal 440 with the LO 405 to convert the received uplink signal 440 from a carrier frequency to a baseband frequency.

In some examples, the frequency offset correction 430 may correct the LO mismatch between the LO 405 and the LO 425, and may correct the frequency offset caused by the Doppler shift in the downlink. However, the frequency offset correction 430 may compound the frequency offset caused by the Doppler shift in the uplink. For example, the frequency offset correction 430 may double a Doppler shift in the uplink.

This may be based at least in part on the UE failing to distinguish between LO mismatches and Doppler shift effects in a measured frequency offset. In this way, when correcting the frequency offset caused by {LO mismatch+ Doppler shift effect}, a received signal may be aligned to the network node, but an uplink transmission may be shifted by 2 times a Doppler shift frequency compared to the network node frequency based at least in part on adding an uplink Doppler shift to the downlink Doppler shift (e.g., the uplink transmission signal is shifted by 1 Doppler shift amount when it is at a UE antenna, but after passing through the channel, network node antennas receive the uplink transmission shifted by another Doppler shift amount to a total of 2 times the Doppler shift). In this way, the network node may observe the 2 times the Doppler shift in the uplink signal.

This frequency offset may degrade performance of UL signal reception at the network node in high Doppler conditions, such as in high-speed train (HST) scenarios. Additionally, or alternatively, based at least in part on using a time domain orthogonal cover code (TD-OCC) scheme for multiuser (MU)-MIMO communications, TD-OCC orthogonality may be degraded based at least in part on the frequency offset correction by the UE. In this way, the UE and the network node may consume network, computing, power, and communication resources to detect and correct communication errors associated with a frequency offset of uplink signals.

In some aspects described herein, a UE may receive a downlink signal and identify a frequency offset of downlink communications. The UE may use the frequency offset to apply a downlink frequency offset correction to the downlink communications. The UE may estimate an uplink frequency offset correction to use for uplink communications. For example, the UE may use the downlink frequency offset correction as an estimated uplink frequency offset correction to use for uplink communications. The UE may transmit an uplink communication having the estimated uplink frequency offset correction applied.

The network node may receive the uplink communication and observe a frequency offset of the uplink communication, as observed at the network node. This frequency offset may be an error of the estimated frequency offset correction applied to the uplink communication. The frequency offset may be based at least in part on the estimated frequency offset correction failing to appropriately correct a component of the frequency offset that is attributed to a Doppler shift (e.g., resulting in a 2× Doppler shift frequency offset). In some aspects, the network node may average the frequency offset for the UE over time. For example, the network node may average the frequency offset for the UE using a weighted average that biases the average in favor of most recently observed frequency offsets.

In some aspects, the network node may identify frequency offsets of uplink communications for multiple UEs. For example, the network node may identify frequency offsets of uplink communications for UEs individually and/or for UEs in a group (e.g., experiencing similar Doppler shift in an HST scenario, for example).

The network node may transmit an indication of the frequency offset of the uplink communication to support UE refinement of the frequency offset correction used for uplink communications. The network node may transmit the indication periodically or a-periodically, in downlink control information (DCI), with a timing advance (TA) indication, and/or with a scheduling DCI or MAC control element (CE). In some aspects, the network node may transmit the indication when using high MIMO (e.g., 4+ layers) or based at least in part on an signal-to-noise ratio (SNR) of communications between the UE and the network node (e.g., use with SNR that satisfies a threshold). In some aspects, the indication may include an explicit indication (e.g., specifying a number of Hz of the offset) or a selection of candidate offset correction with a granularity to reduce overhead of the indication. For example, the indication may have a granularity of 50 Hz, 100, Hz, or 1 KHx, among other examples. In some aspects, candidate offset correction that may be indicated are based at least in part on subcarrier spacing and/or a frequency range of an associated channel.

In some aspects, the network node may receive an indication of support for using different frequency offset corrections for downlink and uplink communications (e.g., a first frequency offset correction for downlink and a second frequency offset correction for uplink). The network node may transmit the indication of the frequency offset based at least in part on receiving an indication of support from the UE. In some aspects, the network node may transmit an indication of one or more resources to be used for the UE to receive the indication of the frequency offset from the network node.

The UE may use the indication of the frequency offset of the uplink communication to generate an updated frequency offset for uplink communications. For example, the UE may add the frequency offset indicated by the network node (e.g., as a positive or negative number) to the estimated uplink frequency offset correction to use for uplink communications.

Based at least in part on the UE applying an updated uplink frequency offset correction for uplink communications (e.g., that is different from a downlink frequency offset correction for downlink communications), the UE may improve frequency offset corrections for uplink and downlink communications, which may reduce error rates caused by frequency offsets in an uplink. Additionally, or alternatively, the network node may conserve computing and/or power resources that may have otherwise been consumed to correct the frequency offset of uplink communications at the network node. Based at least in part on the network node communicating with multiple UEs and/or via multiple layers, the network node may conserve computing and/or power resources may reduce a likelihood of exhausting the resources of the network node.

FIG. 5 is a diagram of an example 500 associated with frequency offset correction, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5. In some aspects, the network node may support a cell of the wireless network and/or pay support MU-MIMO. Additionally, or alternatively, the UE may be in a high-Doppler environment, such as an HST environment.

As shown by reference number 505, the network node may transmit, and the UE may receive, configuration information. In some aspects, the UE may receive the configuration information via one or more of RRC signaling, one or more MAC CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of support for using a frequency offset correction for uplink communications than a frequency offset correction used for downlink communications.

The UE may configure itself based at least in part on the configuration information. In some aspects, the UE may be configured to perform one or more operations described herein based at least in part on the configuration information.

As shown by reference number 510, the UE may transmit, and the network node may receive, a capabilities report. In some aspects, the capabilities report may indicate UE support for using a frequency offset correction for uplink communications and a different frequency offset correction used for downlink communications. In some aspects, the capabilities report may indicate support for adjusting a frequency offset correction based at least in part on reception of the indication of the frequency offset of the first communinication. In some aspects, the UE capabilities report may indicate a requested granularity of an indication of a frequency offset of uplink communications as observed at the network node.

As shown by reference number 515, the UE may receive, and the network node may transmit, an indication to use different frequency offset corrections for uplink and downlink communications. For example, the network node may transmit the indication to use a first frequency offset correction for uplink communications and a second frequency offset correction for downlink communications based at least in part on SNR of communications, a temperature of an environment of the network node and/or the UE, a number of UEs connected to the network node, cell congestions, and/or subcarrier spacing of a channel used for the uplink and/or downlink communications, among other examples.

In some aspects, the network node does not signal a value of frequency offset correction for the UE to apply (e.g., in an indication, the different frequency offset corrections may be applied for uplink and downlink communications). The UE may identify the value of the downlink frequency offset correction based at least in part on tracking a downlink frequency offset dynamically and applying downlink frequency offset corrections without notifying the network node. To support uplink frequency offset correction, the network node may indicate to the UE information for identifying an uplink frequency offset correction (e.g., that is independent from and/or allowed to be different from the downlink frequency offset correction). The UE may apply the uplink frequency offset correction in addition to the downlink frequency offset correction (e.g., autonomous corrections). In some aspects, the downlink frequency offset correction may be weighted toward tracking LO offsets associated with heating and cooling of the device, with a lower weight toward tracking frequency offsets associated with Doppler shift.

As shown by reference number 520, the UE may receive, and the network node may transmit, signaling. For example, the signaling may include a communication that includes data and/or pilots. In some aspects, the signaling may include a reference signal.

As shown by reference number 525, the UE may identify and/or apply a downlink frequency offset. For example, the UE may identify that the signaling has a frequency offset from an indicated resources for the signaling. In some aspects, the UE may identify the value of the downlink frequency offset correction based at least in part on tracking a downlink frequency offset dynamically and applying downlink frequency offset corrections (e.g., without notifying the network node of the downlink frequency offset correction). For example, the UE may use a frequency tracking loop to identify the value of the downlink frequency offset to use for autonomous frequency offset correction in the downlink. In this way, the UE may obtain the downlink frequency offset based at least in part on measuring signals from the network node and without an indication, from the network node, of the downlink frequency offset.

The UE may use an identified downlink frequency offset to correct the signaling (e.g., to correct data of the signaling based at least in part on identifying the frequency offset using the pilots, among other examples) and/or to correct a subsequent downlink communication.

As shown by reference number 530, the UE may identify and/or apply a first uplink frequency offset. In some aspects, the UE may identify the first uplink frequency offset based at least in part on one or more downlink frequency offsets identified in one or more downlink communications. The UE may apply the first uplink frequency offset to an uplink communication.

As shown by reference number 535, the UE may transmit a first uplink communication having the first frequency offset applied.

As shown by reference number 540, the network node may identify an uplink frequency offset as observed at the network node. In some aspects, the uplink frequency offset may be a frequency offset that is observed on a communication having the first uplink frequency offset applied. In some aspects, the uplink frequency offset may be a frequency offset that is observed on a communication that has no frequency offset correction applied. For example, the network node may identify the uplink frequency offset based at least in part on the communication described in connection with reference number 535, or using a different communication that has no uplink frequency offset correction applied (e.g., in the absence of operations shown by reference numbers 530 and 535).

In some aspects, the network node may identify the uplink frequency offset based at least in part on an average frequency offset of communications transmitted by the UE during a period of time.

As shown by reference number 545, the UE may receive, and the network node may transmit, an indication of the frequency offset (e.g., a frequency offset of the first uplink communication as observed at the network node). In some aspects, the indication of the frequency offset may include a UE-specific indication (e.g., to apply only to the UE), or a group-specific indication to apply to multiple UEs. For example, the network node may transmit the group-specific indication to a group of UEs that are traveling together (e.g., in an HST or airplane environment).

In some aspects, the network node may transmit the indication of the frequency offset via a periodic communication, an aperiodic communication, DCI, a communication that includes a timing advance indication, and/or a communication that includes an allocation for the second communication, among other examples.

In some aspects, the network node may transmit the indication of the frequency offset based at least in part on one or more of a number of MIMO layers of one or more of the first communication or the second communication, subcarrier spacing of the first communication or the second communication, and/or an SNR associated with the first communication.

In some aspects, the indication of the frequency offset of the first communication includes an explicit indication of the frequency offset and/or an indication of a selection of the frequency offset from a set of candidate frequency offsets, among other examples. the set of candidate frequency offsets have a granularity that is based at least in part on a number of bits allocated for the indication of the frequency offset, a number of MIMO layers of one or more of the first communication or the second communication, subcarrier spacing of the first communication or the second communication, and/or an SNR associated with the first communication, among other examples.

As shown by reference number 550, the UE may identify and/or apply a second uplink frequency offset. For example, the UE may update the first uplink frequency offset based at least in part on the indication of the frequency offset. In some aspects, the UE may add the frequency offset to the first uplink frequency offset correction to generate the second uplink frequency offset correction.

As shown by reference number 555, the UE may transmit, and the network node may receive, a second uplink communication having the second frequency offset applied.

As shown by reference number 560, the UE may receive, and the network node may transmit a downlink communication.

As shown by reference number 565, the UE may apply the downlink frequency offset correction to the downlink communication. In some aspects, the UE may update the downlink frequency offset correction based at least in part on identifying the downlink frequency offset in the downlink communication (e.g., using pilots of the downlink communication). The downlink frequency offset correction may be different from the second uplink frequency offset correction.

Based at least in part on the UE applying the second uplink frequency offset correction for uplink communications (e.g., that is different from a downlink frequency offset correction for downlink communications), the UE may improve frequency offset corrections for uplink and downlink communications, which may reduce error rates caused by frequency offsets in uplink communications. Additionally, or alternatively, the network node may conserve computing and/or power resources that may have otherwise been consumed to correct the frequency offset of uplink communications at the network node. Based at least in part on the network node communicating with multiple UEs and/or via multiple layers, the network node conserve computing and/or power resources may reduce a likelihood of exhausting the resources of the network node.

As indicated above, FIG. 5 is provided as an example. Other examples may differ from what is described with respect to FIG. 5.

Figure 6:
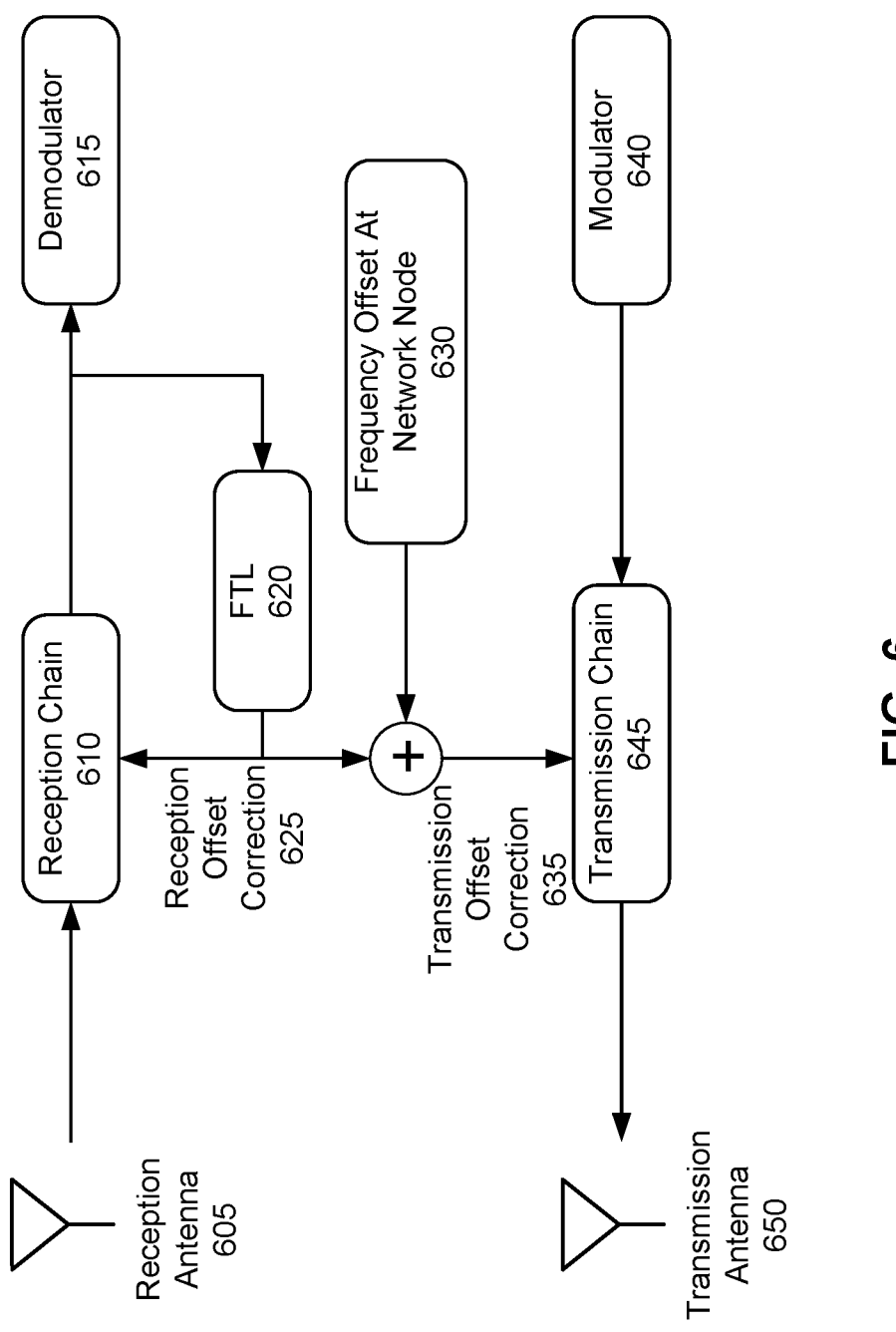
FIG. 6 is a diagram illustrating an example of frequency offset correction, in accordance with the present disclosure.

FIG. 6 is a diagram illustrating an example 600 of frequency offset correction, in accordance with the present disclosure. As shown in FIG. 6, a UE may apply a reception (e.g., downlink or sidelink) offset correction to received communications and a transmission (e.g., uplink or sidelink) offset correction to transmitted communications, with the reception offset correction being different from the transmission offset correction.

As shown in FIG. 6, the UE may use an reception antenna 605 to receive signals (e.g., a communication and/or reference signal). The signals are passed to a reception chain 610 (e.g., including an LO) and to a demodulator 615 (e.g., if the signals include data). The signals may also be provided to a frequency tracking loop (FTL) 620. The UE may use the FTL 620 to maintain synchronization with a transmitting device (e.g., a network node) in a frequency domain. In some aspects, the FTL 620 may identify a frequency offset and/or generate an received offset correction 625. In some aspects, the UE may provide signals associated with pilots to the FTL to identify the reception offset correction 625 and may then apply the reception offset correction 625 to signals that are allocated to data (e.g., within a same communication as the pilots).

In some aspects, the UE may have received an indication of a frequency offset 630 at a network node. The UE may combine the frequency offset 630 at the network node with the reception offset correction 625 to generate a transmission offset correction 635.

The UE may generate signals for transmission. A modulator 640 of the UE may modulate the signals for transmission and provide the signals to a transmission chain 645 (e.g., including the LO). The UE may combine the transmission offset correction 635 to the signals for transmission to generate corrected signals for transmission. The UE may provide the corrected signals for transmission to a transmission antenna 650 (e.g., a same antenna as the reception antenna 605) and transmit the corrected signals over the air.

As indicated above, FIG. 6 is provided as an example. Other examples may differ from what is described with regard to FIG. 6.

FIG. 7 is a diagram illustrating an example process 700 performed, for example, by a UE, in accordance with the present disclosure. Example process 700 is an example where the UE (e.g., UE 120) performs operations associated with frequency offset correction.

As shown in FIG. 7, in some aspects, process 700 may include transmitting a first communication having a first frequency offset correction applied (block 710). For example, the UE (e.g., using transmission component 1004 and/or communication manager 1006, depicted in FIG. 10) may transmit a first communication having a first frequency offset correction applied, as described above.

As further shown in FIG. 7, in some aspects, process 700 may include receiving an indication of a frequency offset of the first communication (block 720). For example, the UE (e.g., using reception component 1002 and/or communication manager 1006, depicted in FIG. 10) may receive an indication of a frequency offset of the first communication, as described above.

As further shown in FIG. 7, in some aspects, process 700 may include transmitting a second communication having a second frequency offset correction applied, the second frequency offset correction based at least in part on the first frequency offset correction and the frequency offset of the first communication (block 730). For example, the UE (e.g., using transmission component 1004 and/or communication manager 1006, depicted in FIG. 10) may transmit a second communication having a second frequency offset correction applied, the second frequency offset correction based at least in part on the first frequency offset correction and the frequency offset of the first communication, as described above.

Process 700 may include additional aspects, such as any single aspect or any combination of aspects described below and/or in connection with one or more other processes described elsewhere herein.

In a first aspect, the indication of the frequency offset of the first communication comprises a UE-specific indication, or a group-specific indication.

In a second aspect, alone or in combination with the first aspect, the indication of the frequency offset of the first communication is based at least in part on an average frequency offset of communications transmitted by the UE during a period of time.

In a third aspect, alone or in combination with one or more of the first and second aspects, receiving the indication of the frequency offset of the first communication comprises receiving the indication via one or more of a periodic communication, an aperiodic communication, downlinking control information (DCI), a communication that includes a timing advance indication, or a communication that includes an allocation for the second communication.

In a fourth aspect, alone or in combination with one or more of the first through third aspects, the receiving the indication of the frequency offset of the first communication is based at least in part on one or more of a number of MIMO layers of one or more of the first communication or the second communication, subcarrier spacing of the first communication or the second communication, or a SNR associated with the first communication.

In a fifth aspect, alone or in combination with one or more of the first through fourth aspects, the indication of the frequency offset of the first communication comprises one or more of an explicit indication of the frequency offset, an indication of a selection of the frequency offset from a set of candidate frequency offsets.

In a sixth aspect, alone or in combination with one or more of the first through fifth aspects, the set of candidate frequency offsets have a granularity that is based at least in part on one or more of a number of bits allocated for the indication of the frequency offset, a number of MIMO layers of one or more of the first communication or the second communication, subcarrier spacing of the first communication or the second communication, or a SNR associated with the first communication.

In a seventh aspect, alone or in combination with one or more of the first through sixth aspects, process 700 includes transmitting an indication of support for one or more of adjusting a frequency offset correction based at least in part on reception of the indication of the frequency offset of the first communication, or transmitting communications using different frequency offset corrections for transmitted communications and received communications, wherein receiving the indication of the frequency offset of the first communication is based at least in part on transmitting the indication of support.

In an eighth aspect, alone or in combination with one or more of the first through seventh aspects, process 700 includes receiving a third communication using a third frequency offset correction, based at least in part on the third communication being a received communication, that is different from the second frequency offset correction, based at least in part on the second frequency offset correction being associated with a transmitted communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with the present disclosure. Example process 800 is an example where the UE (e.g., UE 120) performs operations associated with frequency offset correction.

As shown in FIG. 8, in some aspects, process 800 may include receiving a first communication using a first frequency offset correction based at least in part on the first communication being a received communication (block 810). For example, the UE (e.g., using reception component 1002 and/or communication manager 1006, depicted in FIG. 10) may receive a first communication using a first frequency offset correction based at least in part on the first communication being a received communication, as described above.

As further shown in FIG. 8, in some aspects, process 800 may include transmitting a second communication using a second frequency offset correction that is different from the first frequency offset correction based at least in part on the second communication being a transmitted communication (block 820). For example, the UE (e.g., using transmission component 1004 and/or communication manager 1006, depicted in FIG. 10) may transmit a second communication using a second frequency offset correction that is different from the first frequency offset correction based at least in part on the second communication being a transmitted communication, as described above.

Process 800 may include additional aspects, such as any single aspect or any combination of aspects described below and/or in connection with one or more other processes described elsewhere herein.

In a first aspect, process 800 includes transmitting, before transmitting the second communication, a third communication having a third frequency offset correction applied, and receiving an indication of a frequency offset of the third communication, wherein transmitting the second communication having the second frequency offset correction applied is based at least in part on the third frequency offset correction and the frequency offset of the third communication.

In a second aspect, alone or in combination with the first aspect, the indication of the frequency offset of the first communication comprises a UE-specific indication, or a group-specific indication.

In a third aspect, alone or in combination with one or more of the first and second aspects, the indication of the frequency offset of the third communication is based at least in part on an average frequency offset of communications transmitted from the UE.

In a fourth aspect, alone or in combination with one or more of the first through third aspects, receiving the indication of the frequency offset of the third communication comprises receiving the indication via one or more of a periodic communication, an aperiodic communication, downlinking control information (DCI), a communication that includes a timing advance indication, or a communication that includes an allocation for the second communication.

In a fifth aspect, alone or in combination with one or more of the first through fourth aspects, the receiving the indication of the frequency offset of the third communication is based at least in part on one or more of a number of MIMO layers of one or more of the third communication or the second communication, subcarrier spacing of the first communication or the second communication, or a SNR associated with the third communication.

In a sixth aspect, alone or in combination with one or more of the first through fifth aspects, the indication of the frequency offset of the third communication comprises one or more of an explicit indication of the frequency offset, an indication of a selection of the frequency offset from a set of candidate frequency offsets.

In a seventh aspect, alone or in combination with one or more of the first through sixth aspects, the set of candidate frequency offsets have a granularity that is based at least in part on one or more of a number of bits allocated for the indication of the frequency offset, a number of MIMO layers of one or more of the third communication or the second communication, subcarrier spacing of a channel used for one or more of the third communication or the second communication, or a SNR associated with the third communication.

In an eighth aspect, alone or in combination with one or more of the first through seventh aspects, process 800 includes transmitting an indication of support for one or more of adjusting a frequency offset correction based at least in part on reception of the indication of the frequency offset of the first communication, or transmitting communications using different first frequency offset corrections for transmitted communications and received communications, wherein receiving the first communication using the first frequency offset correction and transmitting the second communication using the second frequency offset correction is based at least in part on transmitting the indication of support.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network node, in accordance with the present disclosure. Example process 900 is an example where the network node (e.g., network node 110) performs operations associated with frequency offset correction.

As shown in FIG. 9, in some aspects, process 900 may include receiving, from a UE, a first communication having a first frequency offset correction applied (block 910). For example, the network node (e.g., using reception component 1102 and/or communication manager 1106, depicted in FIG. 11) may receive, from a UE, a first communication having a first frequency offset correction applied, as described above.

As further shown in FIG. 9, in some aspects, process 900 may include transmitting an indication of a frequency offset of the first communication (block 920). For example, the network node (e.g., using transmission component 1104 and/or communication manager 1106, depicted in FIG. 11) may transmit an indication of a frequency offset of the first communication, as described above.

As further shown in FIG. 9, in some aspects, process 900 may include receiving a second communication having a second frequency offset correction applied, the second frequency offset correction based at least in part on the first frequency offset correction and the frequency offset of the first communication (block 930). For example, the network node (e.g., using reception component 1102 and/or communication manager 1106, depicted in FIG. 11) may receive a second communication having a second frequency offset correction applied, the second frequency offset correction based at least in part on the first frequency offset correction and the frequency offset of the first communication, as described above.

Process 900 may include additional aspects, such as any single aspect or any combination of aspects described below and/or in connection with one or more other processes described elsewhere herein.

In a first aspect, the indication of the frequency offset of the first communication comprises a UE-specific indication, or a group-specific indication.

In a second aspect, alone or in combination with the first aspect, the indication of the frequency offset of the first communication is based at least in part on an average frequency offset of communications transmitted by the UE during a period of time.

In a third aspect, alone or in combination with one or more of the first and second aspects, transmitting the indication of the frequency offset of the first communication comprises transmitting the indication via one or more of a periodic communication, an aperiodic communication, downlinking control information (DCI), a communication that includes a timing advance indication, or a communication that includes an allocation for the second communication.

In a fourth aspect, alone or in combination with one or more of the first through third aspects, the transmitting the indication of the frequency offset of the first communication is based at least in part on one or more of a number of MIMO layers of one or more of the first communication or the second communication, subcarrier spacing of the first communication or the second communication, or a SNR associated with the first communication.

In a fifth aspect, alone or in combination with one or more of the first through fourth aspects, the indication of the frequency offset of the first communication comprises one or more of an explicit indication of the frequency offset, an indication of a selection of the frequency offset from a set of candidate frequency offsets.

In a sixth aspect, alone or in combination with one or more of the first through fifth aspects, the set of candidate frequency offsets have a granularity that is based at least in part on one or more of a number of bits allocated for the indication of the frequency offset, a number of MIMO layers of one or more of the first communication or the second communication, subcarrier spacing of the first communication or the second communication, or a SNR associated with the first communication.

In a seventh aspect, alone or in combination with one or more of the first through sixth aspects, process 900 includes receiving an indication of support of the UE for one or more of adjusting a frequency offset correction based at least in part on reception of the indication of the frequency offset of the first communication, or transmitting communications using different frequency offset corrections for transmitted communications and received communications, wherein receiving the indication of the frequency offset of the first communication is based at least in part on transmitting the indication of support.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
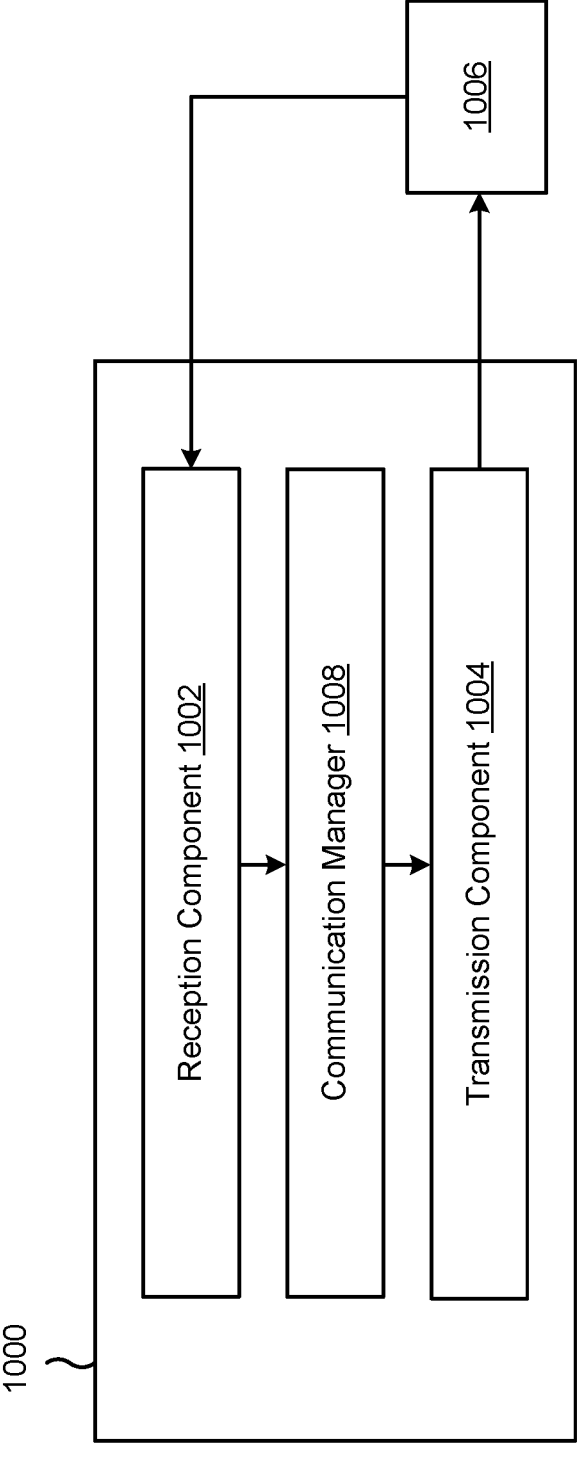
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008 (such as a UE, a base station, or another wireless communication device) using the reception component 1002 and the transmission component 1004.

In some aspects, the apparatus 1000 may be configured to perform one or more operations described herein in connection with FIGS. 5-6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit a first communication having a first frequency offset correction applied. The reception component 1002 may receive an indication of a frequency offset of the first communication. The transmission component 1004 may transmit a second communication having a second frequency offset correction applied, the second frequency offset correction based at least in part on the first frequency offset correction and the frequency offset of the first communication.

The transmission component 1004 may transmit an indication of support for one or more of adjusting a frequency offset correction based at least in part on reception of the indication of the frequency offset of the first communication, or transmitting communications using different frequency offset corrections for transmitted communications and received communications, wherein receiving the indication of the frequency offset of the first communication is based at least in part on transmitting the indication of support.

The reception component 1002 may receive a third communication using a third frequency offset correction, based at least in part on the third communication being a received communication, that is different from the second frequency offset correction, based at least in part on the second frequency offset correction being associated with a transmitted communication.

The reception component 1002 may receive a first communication using a first frequency offset correction based at least in part on the first communication being a received communication. The transmission component 1004 may transmit a second communication using a second frequency offset correction that is different from the first frequency offset correction based at least in part on the second communication being a transmitted communication.

The transmission component 1004 may transmit, before transmitting the second communication, a third communication having a third frequency offset correction applied.

The reception component 1002 may receive an indication of a frequency offset of the third communication wherein transmitting the second communication having the second frequency offset correction applied is based at least in part on the third frequency offset correction and the frequency offset of the third communication.

The transmission component 1004 may transmit an indication of support for one or more of adjusting a frequency offset correction based at least in part on reception of the indication of the frequency offset of the first communication, or transmitting communications using different first frequency offset corrections for transmitted communications and received communications, wherein receiving the first communication using the first frequency offset correction and transmitting the second communication using the second frequency offset correction is based at least in part on transmitting the indication of support.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
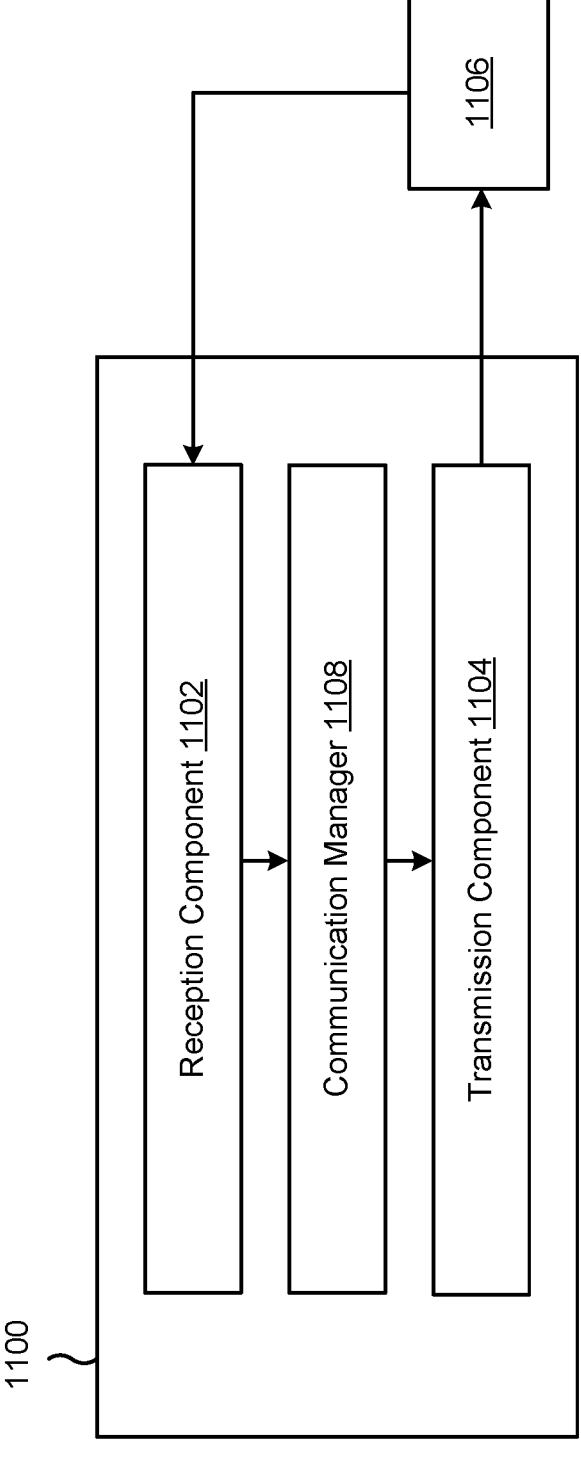
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108 (such as a UE, a base station, or another wireless communication device) using the reception component 1102 and the transmission component 1104.

In some aspects, the apparatus 1100 may be configured to perform one or more operations described herein in connection with FIGS. 5-6. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive, from a UE, a first communication having a first frequency offset correction applied. The transmission component 1104 may transmit an indication of a frequency offset of the first communication. The reception component 1102 may receive a second communication having a second frequency offset correction applied, the second frequency offset correction based at least in part on the first frequency offset correction and the frequency offset of the first communication.

The reception component 1102 may receive an indication of support of the UE for one or more of adjusting a frequency offset correction based at least in part on reception of the indication of the frequency offset of the first communication, or transmitting communications using different frequency offset corrections for transmitted communications and received communications, wherein receiving the indication of the frequency offset of the first communication is based at least in part on transmitting the indication of support.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting a first communication having a first frequency offset correction applied; receiving an indication of a frequency offset of the first communication; and transmitting a second communication having a second frequency offset correction applied, the second frequency offset correction based at least in part on the first frequency offset correction and the frequency offset of the first communication.

Aspect 2: The method of Aspect 1, wherein the indication of the frequency offset of the first communication comprises: a UE-specific indication, or a group-specific indication.

Aspect 3: The method of any of Aspects 1-2, wherein the indication of the frequency offset of the first communication is based at least in part on an average frequency offset of communications transmitted by the UE during a period of time.

Aspect 4: The method of any of Aspects 1-3, wherein receiving the indication of the frequency offset of the first communication comprises receiving the indication via one or more of: a periodic communication, an aperiodic communication, downlink control information (DCI), a communication that includes a timing advance indication, or a communication that includes an allocation for the second communication.

Aspect 5: The method of any of Aspects 1-4, wherein the receiving the indication of the frequency offset of the first communication is based at least in part on one or more of: a number of multiple-input multiple-output (MIMO) layers of one or more of the first communication or the second communication, subcarrier spacing of the first communication or the second communication, or a signal-to-noise ratio (SNR) associated with the first communication.

Aspect 6: The method of any of Aspects 1-5, wherein the indication of the frequency offset of the first communication comprises one or more of: an explicit indication of the frequency offset, an indication of a selection of the frequency offset from a set of candidate frequency offsets.

Aspect 7: The method of Aspect 6, wherein the set of candidate frequency offsets have a granularity that is based at least in part on one or more of: a number of bits allocated for the indication of the frequency offset, a number of multiple-input multiple-output (MIMO) layers of one or more of the first communication or the second communication, subcarrier spacing of the first communication or the second communication, or a signal-to-noise ratio (SNR) associated with the first communication.

Aspect 8: The method of Aspect 7, further comprising transmitting an indication of support for one or more of: adjusting a frequency offset correction based at least in part on reception of the indication of the frequency offset of the first communication, or transmitting communications using different frequency offset corrections for transmitted communications and received communications, wherein receiving the indication of the frequency offset of the first communication is based at least in part on transmitting the indication of support.

Aspect 9: The method of any of Aspects 1-8, further comprising: receiving a third communication using a third frequency offset correction, based at least in part on the third communication being a received communication, that is different from the second frequency offset correction, based at least in part on the second frequency offset correction being associated with a transmitted communication.

Aspect 10: A method of wireless communication performed by a user equipment (UE), comprising: receiving a first communication using a first frequency offset correction based at least in part on the first communication being a received communication; and transmitting a second communication using a second frequency offset correction that is different from the first frequency offset correction based at least in part on the second communication being a transmitted communication.

Aspect 11: The method of Aspect 10, further comprising: transmitting, before transmitting the second communication, a third communication having a third frequency offset correction applied; and receiving an indication of a frequency offset of the third communication, wherein transmitting the second communication having the second frequency offset correction applied is based at least in part on the third frequency offset correction and the frequency offset of the third communication.

Aspect 12: The method of Aspect 11, wherein the indication of the frequency offset of the first communication comprises: a UE-specific indication, or a group-specific indication.

Aspect 13: The method of Aspect 11, wherein the indication of the frequency offset of the third communication is based at least in part on an average frequency offset of communications transmitted from the UE.

Aspect 14: The method of Aspect 11, wherein receiving the indication of the frequency offset of the third communication comprises receiving the indication via one or more of: a periodic communication, an aperiodic communication, downlink control information (DCI), a communication that includes a timing advance indication, or a communication that includes an allocation for the second communication.

Aspect 15: The method of Aspect 11, wherein the receiving the indication of the frequency offset of the third communication is based at least in part on one or more of: a number of multiple-input multiple-output (MIMO) layers of one or more of the third communication or the second communication, subcarrier spacing of the first communication or the second communication, or a signal-to-noise ratio (SNR) associated with the third communication.

Aspect 16: The method of Aspect 11, wherein the indication of the frequency offset of the third communication comprises one or more of: an explicit indication of the frequency offset, an indication of a selection of the frequency offset from a set of candidate frequency offsets.

Aspect 17: The method of Aspect 16, wherein the set of candidate frequency offsets have a granularity that is based at least in part on one or more of: a number of bits allocated for the indication of the frequency offset, a number of multiple-input multiple-output (MIMO) layers of one or more of the third communication or the second communication, subcarrier spacing of a channel used for one or more of the third communication or the second communication, or a signal-to-noise ratio (SNR) associated with the third communication.

Aspect 18: The method of Aspect 11, further comprising transmitting an indication of support for one or more of: adjusting a frequency offset correction based at least in part on reception of the indication of the frequency offset of the first communication, or transmitting communications using different first frequency offset corrections for transmitted communications and received communications, wherein receiving the first communication using the first frequency offset correction and transmitting the second communication using the second frequency offset correction is based at least in part on transmitting the indication of support.

Aspect 19: A method of wireless communication performed by a network node, comprising: receiving, from a user equipment (UE), a first communication having a first frequency offset correction applied; transmitting an indication of a frequency offset of the first communication; and receiving a second communication having a second frequency offset correction applied, the second frequency offset correction based at least in part on the first frequency offset correction and the frequency offset of the first communication.

Aspect 20: The method of Aspect 19, wherein the indication of the frequency offset of the first communication comprises: a UE-specific indication, or a group-specific indication.

Aspect 21: The method of any of Aspects 19-20, wherein the indication of the frequency offset of the first communication is based at least in part on an average frequency offset of communications transmitted by the UE during a period of time.

Aspect 22: The method of any of Aspects 19-21, wherein transmitting the indication of the frequency offset of the first communication comprises transmitting the indication via one or more of: a periodic communication, an aperiodic communication, downlink control information (DCI), a communication that includes a timing advance indication, or a communication that includes an allocation for the second communication.

Aspect 23: The method of any of Aspects 19-22, wherein the transmitting the indication of the frequency offset of the first communication is based at least in part on one or more of: a number of multiple-input multiple-output (MIMO) layers of one or more of the first communication or the second communication, subcarrier spacing of the first communication or the second communication, or a signal-to-noise ratio (SNR) associated with the first communication.

Aspect 24: The method of any of Aspects 19-23, wherein the indication of the frequency offset of the first communication comprises one or more of: an explicit indication of the frequency offset, an indication of a selection of the frequency offset from a set of candidate frequency offsets.

Aspect 25: The method of Aspect 24, wherein the set of candidate frequency offsets have a granularity that is based at least in part on one or more of: a number of bits allocated for the indication of the frequency offset, a number of multiple-input multiple-output (MIMO) layers of one or more of the first communication or the second communication, subcarrier spacing of the first communication or the second communication, or a signal-to-noise ratio (SNR) associated with the first communication.

Aspect 26: The method of Aspect 25, further comprising receiving an indication of support of the UE for one or more of: adjusting a frequency offset correction based at least in part on reception of the indication of the frequency offset of the first communication, or transmitting communications using different frequency offset corrections for transmitted communications and received communications, wherein receiving the indication of the frequency offset of the first communication is based at least in part on transmitting the indication of support.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit a first uplink communication having a first frequency offset correction applied;
receive an indication of a frequency offset of the first uplink communication, wherein the indication is based at least in part on an average frequency offset of communications transmitted by the UE during a period of time; and
transmit a second uplink communication having a second frequency offset correction applied, the second frequency offset correction based at least in part on the first frequency offset correction and the frequency offset of the first uplink communication.

2. The UE of claim 1, wherein the indication of the frequency offset of the first uplink communication comprises:
a UE-specific indication, or
a group-specific indication.

3. The UE of claim 1, wherein the one or more processors, to receive the indication of the frequency offset of the first uplink communication, are configured to receive the indication via one or more of:
a periodic communication,
an aperiodic communication,

36 downlink control information (DCI),
a communication that includes a timing advance indication, or
a communication that includes an allocation for the second uplink communication.

4. The UE of claim 1, wherein the receiving the indication of the frequency offset of the first uplink communication is based at least in part on one or more of:
a number of multiple-input multiple-output (MIMO) layers of one or more of the first uplink communication or the second uplink communication,
subcarrier spacing of the first uplink communication or the second uplink communication, or
a signal-to-noise ratio (SNR) associated with the first uplink communication.

5. The UE of claim 1, wherein the indication of the frequency offset of the first uplink communication comprises one or more of:
an explicit indication of the frequency offset, or
an indication of a selection of the frequency offset from a set of candidate frequency offsets.

6. The UE of claim 5, wherein the set of candidate frequency offsets have a granularity that is based at least in part on one or more of:
a number of bits allocated for the indication of the frequency offset of the first uplink communication,
a number of multiple-input multiple-output (MIMO) layers of one or more of the first uplink communication or the second uplink communication,
subcarrier spacing of the first uplink communication or the second uplink communication, or
a signal-to-noise ratio (SNR) associated with the first uplink communication.

7. The UE of claim 6, wherein the one or more processors are further configured to transmit an indication of support for one or more of:
adjust a frequency offset correction based at least in part on reception of the indication of the frequency offset of the first uplink communication, or
transmit communications using different frequency offset corrections for transmitted communications and received communications,
wherein receiving the indication of the frequency offset of the first uplink communication is based at least in part on transmitting the indication of support.

8. The UE of claim 1, wherein the one or more processors are further configured to:
receive a third communication using a third frequency offset correction, based at least in part on the third communication being a received communication, that is different from the second frequency offset correction, based at least in part on the second frequency offset correction being associated with a transmitted communication.

9. A UE for wireless communication, comprising:
a memory; and
one or more processors, coupled to the memory, configured to:
receive a downlink communication using a downlink frequency offset correction based at least in part on the downlink communication being a received communication;
transmit a first uplink communication having a first frequency offset correction applied;
receive an indication of a frequency offset of the first uplink communication, wherein the indication is based at least in part on an average frequency offset of communications transmitted by the UE during a period of time; and transmit a second uplink communication using a second frequency offset correction that is different from the downlink frequency offset correction based at least in part on the first frequency offset correction and the frequency offset of the first uplink communication.

10. The UE of claim 9, wherein the indication of the frequency offset of the downlink communication comprises:

a UE-specific indication, or a group-specific indication.

11. The UE of claim 9, wherein the one or more processors, to receive the indication of the frequency offset of the first uplink communication, are configured to receive the indication via one or more of:

a periodic communication, an aperiodic communication, downlink control information (DCI), a communication that includes a timing advance indication, or a communication that includes an allocation for the second uplink communication.

12. The UE of claim 9, wherein the one or more processors, to receive the indication of the frequency offset of the first uplink communication, are configured to receive the indication based at least in part on one or more of:

a number of multiple-input multiple-output (MIMO) layers of one or more of the first uplink communication or the second uplink communication, subcarrier spacing of the downlink communication or the second uplink communication, or a signal-to-noise ratio (SNR) associated with the first uplink communication.

13. The UE of claim 9, wherein the indication of the frequency offset of the first uplink communication comprises one or more of:

an explicit indication of the frequency offset, or an indication of a selection of the frequency offset from a set of candidate frequency offsets.

14. The UE of claim 13, wherein the set of candidate frequency offsets have a granularity that is based at least in part on one or more of:

a number of bits allocated for the indication of the frequency offset of the first uplink communication, a number of multiple-input multiple-output (MIMO) layers of one or more of the first uplink communication or the second uplink communication, subcarrier spacing of a channel used for one or more of the first uplink communication or the second uplink communication, or a signal-to-noise ratio (SNR) associated with the first uplink communication.

15. The UE of claim 9, wherein the one or more processors are further configured to transmit an indication of support for one or more of:

adjust a frequency offset correction based at least in part on reception of the indication of the frequency offset of the first uplink communication, or transmit communications using different downlink frequency offset corrections for transmitted communications and received communications, wherein receiving the downlink communication using the downlink frequency offset correction and transmitting the second uplink communication using the second frequency offset correction is based at least in part on transmitting the indication of support.

16. A network node for wireless communication, comprising:

a memory; and one or more processors, coupled to the memory, configured to:

receive, from a user equipment (UE), a first uplink communication having a first frequency offset correction applied;

transmit an indication of a frequency offset of the first uplink communication, wherein the indication is based at least in part on an average frequency offset of communications transmitted by the UE during a period of time; and receive a second uplink communication having a second frequency offset correction applied, the second frequency offset correction based at least in part on the first frequency offset correction and the frequency offset of the first uplink communication.

17. The network node of claim 16, wherein the indication of the frequency offset of the first uplink communication comprises:

a UE-specific indication, or a group-specific indication.

18. The network node of claim 16, wherein the one or more processors, to transmit the indication of the frequency offset of the first uplink communication, are configured to transmit the indication via one or more of:

a periodic communication, an aperiodic communication, downlink control information (DCI), a communication that includes a timing advance indication, or a communication that includes an allocation for the second uplink communication.

19. The network node of claim 16, wherein the transmitting the indication of the frequency offset of the first uplink communication is based at least in part on one or more of:

a number of multiple-input multiple-output (MIMO) layers of one or more of the first uplink communication or the second uplink communication, subcarrier spacing of the first uplink communication or the second uplink communication, or a signal-to-noise ratio (SNR) associated with the first uplink communication.

20. The network node of claim 16, wherein the indication of the frequency offset of the first uplink communication comprises one or more of:

an explicit indication of the frequency offset, or an indication of a selection of the frequency offset from a set of candidate frequency offsets.

21. The network node of claim 20, wherein the set of candidate frequency offsets have a granularity that is based at least in part on one or more of:

a number of bits allocated for the indication of the frequency offset of the first uplink communication, a number of multiple-input multiple-output (MIMO) layers of one or more of the first uplink communication or the second uplink communication, subcarrier spacing of the first uplink communication or the second uplink communication, or a signal-to-noise ratio (SNR) associated with the first uplink communication.

22. The network node of claim 21, wherein the one or more processors are further configured to receive an indication of support of the UE for one or more of:

adjust a frequency offset correction based at least in part on reception of the indication of the frequency offset of the first uplink communication, or transmit communications using different frequency offset corrections for transmitted communications and received communications, wherein receiving the indication of the frequency offset of the first uplink communication is based at least in part on transmitting the indication of support.

23. A method of wireless communication performed by a user equipment (UE), comprising:

transmitting a first uplink communication having a first frequency offset correction applied;

receiving an indication of a frequency offset of the first uplink communication, wherein the indication is based at least in part on an average frequency offset of communications transmitted by the UE during a period of time; and transmitting a second uplink communication having a second frequency offset correction applied, the second frequency offset correction based at least in part on the first frequency offset correction and the frequency offset of the first uplink communication.

24. The method of claim 23, wherein receiving the indication of the frequency offset of the first uplink communication comprises receiving the indication via one or more of:

a periodic communication, an aperiodic communication, downlink control information (DCI), a communication that includes a timing advance indication, or a communication that includes an allocation for the second uplink communication.

25. The method of claim 23, wherein the indication of the frequency offset of the first uplink communication comprises one or more of:

an explicit indication of the frequency offset, or an indication of a selection of the frequency offset from a set of candidate frequency offsets.

26. The method of claim 25, wherein the set of candidate frequency offsets have a granularity that is based at least in part on one or more of:

a number of bits allocated for the indication of the frequency offset of the first uplink communication, a number of multiple-input multiple-output (MIMO) layers of one or more of the first uplink communication or the second uplink communication, subcarrier spacing of the first uplink communication or the second uplink communication, or a signal-to-noise ratio (SNR) associated with the first uplink communication.

27. The method of claim 26, further comprising transmitting an indication of support for one or more of:

adjusting a frequency offset correction based at least in part on reception of the indication of the frequency offset of the first uplink communication, or transmitting communications using different frequency offset corrections for transmitted communications and received communications, wherein receiving the indication of the frequency offset of the first uplink communication is based at least in part on transmitting the indication of support.

28. The method of claim 23, wherein the indication of the frequency offset of the first uplink communication comprises:

a UE-specific indication, or a group-specific indication.

29. The method of claim 23, wherein the receiving the indication of the frequency offset of the first uplink communication is based at least in part on one or more of:

a number of multiple-input multiple-output (MIMO) layers of one or more of the first uplink communication or the second uplink communication, subcarrier spacing of the first uplink communication or the second uplink communication, or a signal-to-noise ratio (SNR) associated with the first uplink communication.

* * * * *